UNITED STATES PATENT OFFICE.

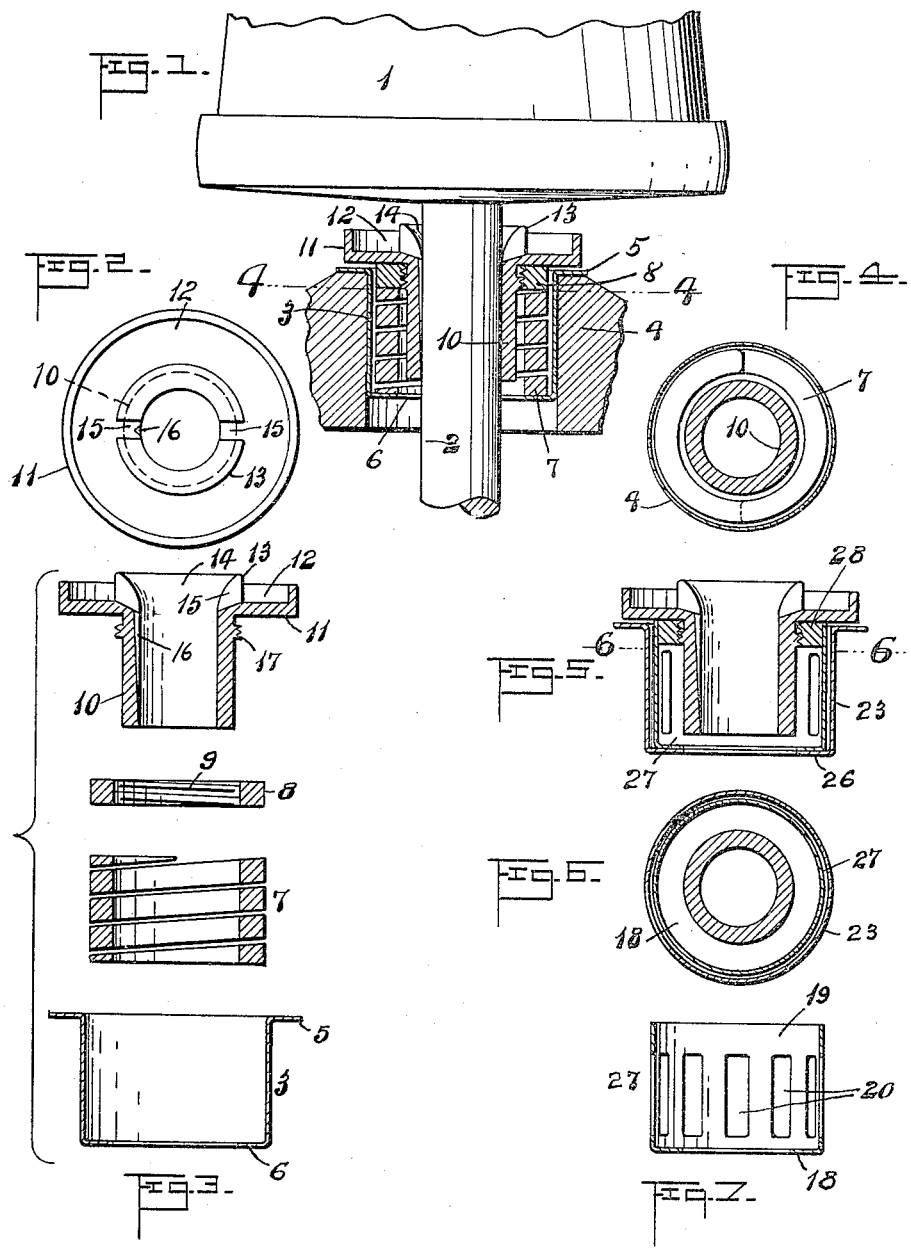

JOHN POHL, OF BLOOMFIELD, NEW JERSEY, ASSIGNOR TO EMPIRE CREAM SEPARATOR COMPANY, OF BLOOMFIELD, NEW JERSEY, A CORPORATION OF NEW JERSEY.

JOURNAL-BEARING.

1,125,392. Specification of Letters Patent. Patented Jan. 19, 1915.

Application filed April 1, 1910, Serial No. 552,886. Renewed February 28, 1911. Serial No. 611,516.

*To all whom it may concern:*

Be it known that I, JOHN POHL, a subject of the Czar of Russia, and a resident of Bloomfield, county of Essex, and State of New Jersey, have invented certain new and useful Improvements in Journal-Bearings, of which the following is a specification.

This invention relates more especially to journal bearings for the bowl spindles of centrifugal cream separators, although the invention may obviously be applicable to other journal bearings.

The objects of the invention are to neutralize vibrations of the bowl, to secure the requisite freedom of the spindle to adjust itself, and yet prevent looseness of said spindle in its bearing; to provide a simple and inexpensive construction; to enable the parts of the bearing to be conveniently accessible, and to obtain other advantages and results as may be brought out in the following description.

Referring to the accompanying drawings, in which like numerals of reference indicate corresponding parts in each of the several figures, Figure 1 is a central vertical section of my improved journal bearing, showing it in its relation to the frame and bowl spindle of a centrifugal cream separator; Fig. 2 is a plan of the journal bearing; Fig. 3 shows the different parts of the journal bearing in central vertical section, as in Fig. 1, but separated from one another; Fig. 4 is a cross-section of the journal bearing, taken on line 4—4 of Fig. 1; Fig. 5 shows in central vertical section a journal bearing of my improved construction having a modified form of spring; Fig. 6 is a cross-section taken on line 6—6 of Fig. 5, and Fig. 7 is a central vertical section of the modified spring removed from the journal bearing.

In said drawings, 1 indicates the bowl of a centrifugal cream separator having a spindle 2 in connection with which I have shown my improved journal bearing. Said bearing has an outer cylindric casing 3 which is seated in fixed position in a socket therefor in the frame 4 of the machine, said casing having an exterior top flange Fig. 5 to keep it from dropping down through the socket and an interior bottom flange 6 extending around the spindle to support the parts of the bearing hereinafter described.

7 and 8 represent a cylindrical helical spring, the upper end 8 of said spring being interiorly screw threaded, as at 9 (see Fig. 1). In Fig. 3 the parts 7 and 8 are shown separate, the part 8 in this instance being a ring which in practical use is rigidly secured to the part 7 by solder or other means. The spring 7, 8 is rigidly secured at its lower end to the flange 6, by soldering or other means, and extends upward through the casing 3, but with an annular space between it and the casing. Into the said spring 7, 8 from its top depends a sleeve 10, which at its inside nicely fits the shaft 2, and provides a bearing in which said shaft can turn or rotate without any looseness. Said sleeve terminates at its lower end near the bottom of the casing 3, and at its upper end has a radially projecting flange 11 which seats upon the part 8, said flange having an annular recess 12 to contain oil or other lubricant. The upper end of the sleeve 10 projects above the flange 11, as at 13, and its inner wall flares outwardly on curved lines, as at 14. Radial slots 15 through said projecting end 13 of the sleeve afford a passage for the lubricant in the recess 12 of the flange 11 to the shaft, and grooves 16 extend downward from said slots 15. The lower part of the sleeve 10 is of sufficiently smaller diameter than the spring 7 to provide an annular space between them, except at its upper part adjacent to the flange 11 where the sleeve has projecting screw threads 17 adapted to engage the threads 9 upon the interior of the part 8.

It will be understood that in the operation of my improved journal bearing, the helical spring 7, 8 is fast at its lower end to the flange 6 of the casing which is fast in the frame 4 of the machine, and the sleeve 10 is removably and adjustably secured to the upper end of said spring by screwing into the same and with the top flange 11 extending over the flange 5 of the casing, all as shown in Fig. 1 of the drawings. Also there are annular spaces between the said helical spring 7, 8 and the casing 3 and the sleeve 10, respectively; and the top flange 11 of the sleeve is spaced from the casing 3 and its top flange 5. The bowl spindle 2 fits nicely in the sleeve 10, and by reason of the elastic or yielding qualities of the spring, said sleeve, while normally held in central axial alinement with the casing 3, can nevertheless depart slightly from such axial alinement, or rock to a limited extent, to accommodate the position which the bowl spindle 2 assumes in its rotation at the high speed common in centrifugal cream separators and such machines. The top flange 11 of the sleeve extends radially outward over the top of the casing above the same and is close to the same, so that said top flange may engage said top of the casing as a stop against undue downward movement.

In Figs. 5 to 7 I have shown a somewhat different form of spring to that shown in the preceding figures, the other figures remaining the same. In said Figs. 5 to 7, the spring at its lower end has an inturned flange 18, and an inwardly extending flange or ring at its upper end provided with interior screw threads, for the purpose of removably and adjustably securing the sleeve 10 to the spring. The part of the spring between the upper and lower flanges is provided with slots or openings 20. The upper ring or flange is preferably made separate from the rest of the spring, as shown at 21, the rest of the spring is preferably made of sheet metal to provide the proper resiliency, and the ring 21 is fitted into the sheet metal cylinder, and rigidly secured thereto by solder or other means. As in the construction shown in Figs. 1 to 4, there is an annular space between the spring and the casing 3, and between the spring and the sleeve 10. The operation of the bearing shown in Figs. 5, 6 and 7 is the same as that of the one shown in Figs. 1 to 4, except so far as the resiliency of the sheet metal spring differs from that of the helical spring.

Both forms of springs are cylindrical in that both surround the sleeve, and are inclosed between it and the casing, and it is in this sense that the word "cylindrical" is used.

I do not limit myself to the precise construction hereinbefore described, and illustrated in the drawings, as changes may be made therein without departing from my invention.

What I claim as new, and desire to secure by Letters Patent, is:—

1. A journal or spindle bearing comprising a casing, a sleeve in said casing, a spring and ring between said casing and sleeve, the lower end of said spring secured to said casing, and the upper end secured to said ring, and said sleeve removably secured to said ring.

2. A journal or spindle bearing comprising a casing, a sleeve in said casing, a spring and ring between said casing and sleeve, the lower end of said spring secured to said casing, and the upper end secured to said ring, and said sleeve removably secured to said ring and having a stop for bearing upon said ring.

3. A journal or spindle bearing comprising a casing, a sleeve in said casing, a cylindrical spring and ring between said casing and sleeve, the lower end of said spring secured to said casing, and the upper end secured to said ring, and said sleeve removably secured to said ring and having a flange stop on said sleeve for bearing upon said ring.

4. In a journal bearing, the combination of a casing, a sleeve in said casing having an exterior flange overlapping said casing and screw threads adjacent to said flange, a ring screwed upon said sleeve against said flange, and a helical spring between the sleeve and casing fast at its opposite ends to said casing and screw ring, respectively.

5. In a journal bearing, the combination of a cylindrical casing having at its top an exterior flange and at its bottom an interior flange, a sleeve in said casing having at its upper end an exterior flange overlying the said top flange of the casing, said sleeve being exteriorly screw threaded adjacent to said top flange, an interiorly threaded ring screwed upon said sleeve against its top flange, and a cylindrical spring between said sleeve and casing made fast at its opposite ends to the bottom flange of the casing and said screw ring, and spaced at its outer and inner sides from the casing and sleeve respectively.

6. In a journal bearing, the combination of a cylindrical casing having at its top an exterior flange and at its bottom an interior flange, a sleeve in said casing having at its upper end an exterior flange overlying the said top flange of the casing, said sleeve being exteriorly screw-threaded adjacent to said top flange, an interiorly threaded ring screwed upon said sleeve against its top flange, and a helical spring between said sleeve and casing abutting at its lower end the bottom flange of the casing and at its upper end the under side of the screw ring, and fast at said ends to said flange and screw ring respectively, said helical spring being spaced at its outer and inner sides from the casing and sleeve respectively.

7. In a journal bearing, the combination of a cylindrical casing having at its bottom an interior flange, a sleeve in said casing, a ring on said sleeve extending in a vertical direction both above and below the top of the casing and spaced at its outer walls from said casing, and a helical spring between said sleeve and casing and spaced therefrom at its inner and outer walls respectively, said spring being fast at its opposite ends to the top of the bottom flange of the casing and to the bottom of the said ring on the sleeve.

8. In a journal bearing, the combination of a cylindrical casing having at its bottom an interior flange, a sleeve in said casing, a ring on said sleeve extending in a vertical direction both above and below the top of the casing and being spaced at its outer walls from said casing, and a cylindrical spring between said sleeve and casing and spaced therefrom at its inner and outer walls respectively, said spring being fast at its opposite ends to the bottom flange of the casing and to the said ring on the sleeve.

9. In a journal bearing, the combination of a casing, a sleeve in said casing having an exterior flange at its top provided with an annular recess, and slots in the inner wall of said recess, a spring between said casing and sleeve, and secured at one end to said casing, and said sleeve below said flange removably secured to said spring.

JOHN POHL.

In the presence of—
RUSSELL M. EVERETT,
FRANCES W. BLODGETT.

Copies of this patent may be obtained for five cents each, by addressing the "Commissioner of Patents, Washington, D. C."